US011813811B2

(12) United States Patent
McCowin

(10) Patent No.: US 11,813,811 B2
(45) Date of Patent: Nov. 14, 2023

(54) CONFORMABLE APPARATUS, SYSTEMS AND METHODS FOR TREATING A COMPOSITE MATERIAL

(71) Applicant: The Boeing Company, Chicago, IL (US)

(72) Inventor: Peter D. McCowin, Enumclaw, WA (US)

(73) Assignee: The Boeing Company, Arlington, VA (US)

(*) Notice: Subject to any disclaimer, the term of this patent is extended or adjusted under 35 U.S.C. 154(b) by 745 days.

(21) Appl. No.: 16/419,178

(22) Filed: May 22, 2019

(65) Prior Publication Data
US 2020/0368946 A1    Nov. 26, 2020

(51) Int. Cl.
*B29C 70/54* (2006.01)
*B29C 70/42* (2006.01)
*B29C 43/36* (2006.01)

(52) U.S. Cl.
CPC .............. *B29C 70/54* (2013.01); *B29C 43/36* (2013.01); *B29C 70/42* (2013.01)

(58) Field of Classification Search
CPC ..... B29C 33/02; B29C 33/301; B29C 33/308; B29C 43/04; B29C 43/36; B29C 43/361; B29C 70/34
See application file for complete search history.

(56) References Cited

U.S. PATENT DOCUMENTS

| 2,850,071 | A | * | 9/1958 | Kraybill | ................. | B21D 11/02 |
| | | | | | | 425/397 |
| 5,387,098 | A | * | 2/1995 | Willden | ................. | B29C 33/50 |
| | | | | | | 264/257 |
| 5,454,897 | A | * | 10/1995 | Vaniglia | ................. | B29C 70/32 |
| | | | | | | 156/166 |
| 5,526,739 | A | * | 6/1996 | Lauderbaugh | .......... | F26B 13/28 |
| | | | | | | 100/269.03 |
| 6,390,169 | B1 | | 5/2002 | Johnson | | |
| 7,341,086 | B2 | | 3/2008 | Nelson et al. | | |

(Continued)

FOREIGN PATENT DOCUMENTS

| EP | 2 014 448 | 1/2009 |
| EP | 2 392 714 | 12/2011 |
| EP | 2 561 979 | 2/2013 |

OTHER PUBLICATIONS

European Patent Office, Extended European Search Report, App. No. 20163109.0 (dated Oct. 19, 2020).

*Primary Examiner* — Jerzi H Moreno Hernandez
(74) *Attorney, Agent, or Firm* — Walters & Wasylyna LLC

(57) ABSTRACT

A conformable apparatus for treating a composite material. The conformable apparatus includes a contact layer that is conformable and includes a plurality of contact elements. Each contact element of the plurality of contact elements includes a first major side, a second major side opposed from said first major side, and at least one side surface extending between said first major side and said second major side. The contact layer further includes a contact surface at least partially defined by the first major sides of the plurality of contact elements and a backing surface at least partially defined by the second major sides of said plurality of contact elements. The conformable apparatus also includes a backing layer positioned against said backing surface of said contact layer.

30 Claims, 12 Drawing Sheets

(56) References Cited

U.S. PATENT DOCUMENTS

| | | | | |
|---|---|---|---|---|
| 10,843,348 B1* | 11/2020 | Aduh | B25J 15/0023 | |
| 2003/0227107 A1* | 12/2003 | Stewart | B29C 43/183 | 264/236 |
| 2008/0083505 A1* | 4/2008 | Cope | B29C 70/388 | 156/459 |
| 2009/0299342 A1* | 12/2009 | Cavanaugh, II | A61F 15/008 | 604/543 |
| 2011/0287213 A1* | 11/2011 | Suzuki | B32B 5/26 | 428/113 |
| 2012/0133066 A1* | 5/2012 | Sanz Pascula | B29C 33/308 | 264/40.1 |
| 2013/0115404 A1* | 5/2013 | Goehlich | B29C 66/12443 | 428/45 |
| 2014/0110875 A1* | 4/2014 | Khan | B29C 43/58 | 425/149 |
| 2015/0019013 A1* | 1/2015 | Rose | B25J 13/08 | 702/41 |
| 2015/0041048 A1* | 2/2015 | Anderson | B29C 70/38 | 156/196 |
| 2015/0174832 A1* | 6/2015 | Wollenweber | B29C 70/34 | 156/362 |
| 2016/0016366 A1* | 1/2016 | Robins | B29C 43/36 | 425/356 |
| 2016/0121560 A1* | 5/2016 | Lee | B29D 99/0003 | 264/511 |
| 2016/0151983 A1* | 6/2016 | Coquel | B29C 70/388 | 156/252 |
| 2017/0100894 A1* | 4/2017 | Burns | B29C 35/0288 | |
| 2018/0169911 A1* | 6/2018 | Heim | B29C 43/18 | |
| 2018/0215083 A1* | 8/2018 | Halford | B29C 33/202 | |
| 2018/0370159 A1* | 12/2018 | Lutz | B29C 70/549 | |
| 2019/0047158 A1* | 2/2019 | Petrovski | B25J 15/0061 | |
| 2020/0238637 A1* | 7/2020 | Rodgers | B29C 70/546 | |
| 2020/0307032 A1* | 10/2020 | Burchardt | B29C 33/308 | |

* cited by examiner

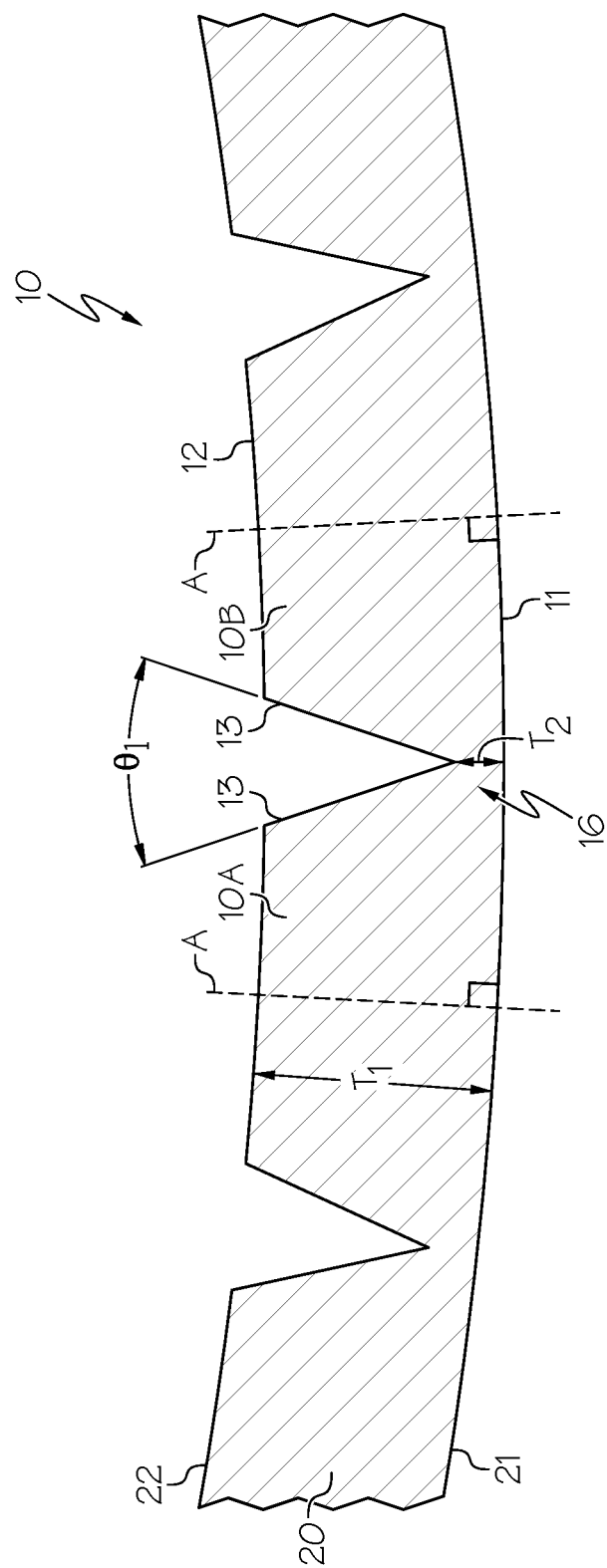

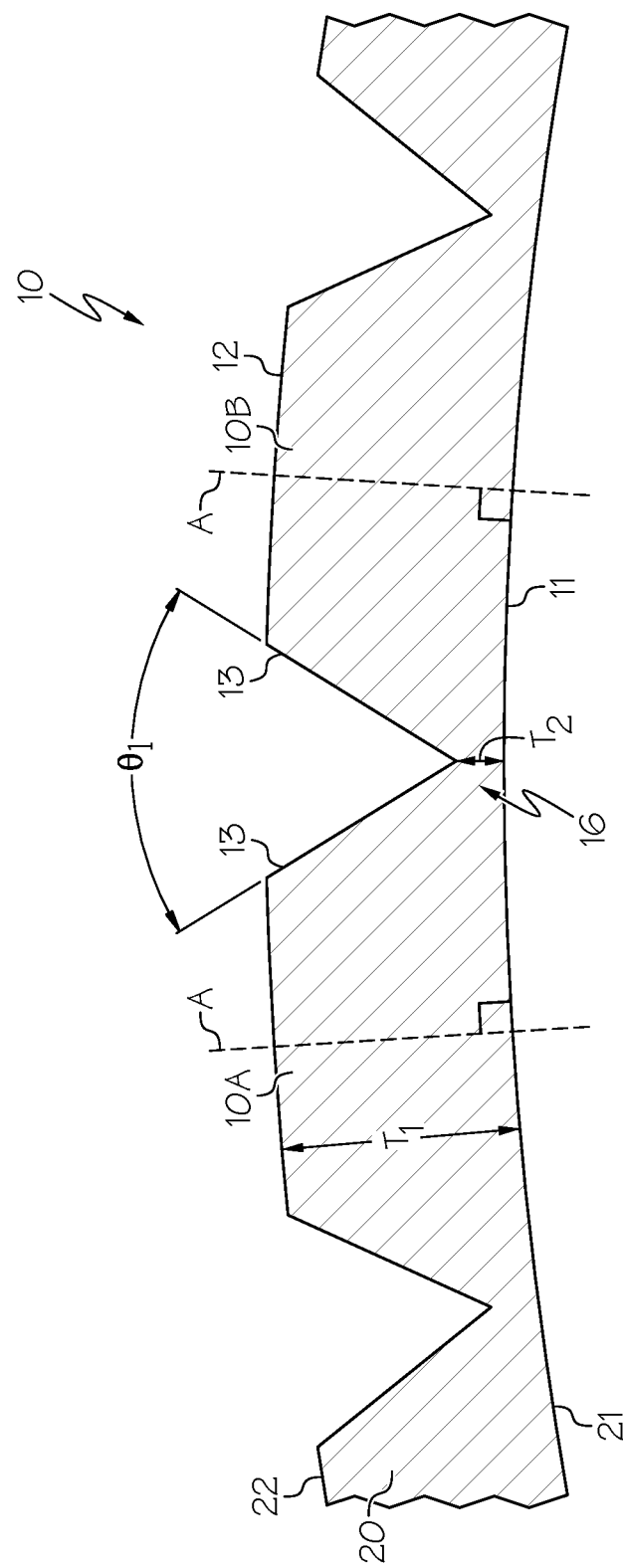

CONFORMABLE APPARATUS, SYSTEMS AND METHODS FOR TREATING A COMPOSITE MATERIAL

FIELD

This application relates composite material placement and, more particularly, to conformable apparatus, systems and methods for treating a composite material, such as smoothing, compressing and/or compacting the composite material.

BACKGROUND

At various stages throughout the process of forming a composite material (such as a thermoplastic composite material), it may be desirable to apply a compressive force to the composite material. The composite material may contain wrinkles or pockets of air during placement, or it may be required to mold the composite material into a particular shape. As such, the compressive force may be applied to either smooth or shape the composite material prior to consolidation. However, when the composite material being formed is placed against a non-planar contouring surface, it is often difficult to apply a uniform compressive force to the composite material using typical compaction devices, such as segmented compactive rollers articulating in various axis of motion and freedom.

Accordingly, those skilled in the art continue with research and development efforts in the field of composite material placement.

SUMMARY

In one example, a conformable apparatus for treating a composite material includes a contact layer that is conformable and includes a plurality of contact elements. Each contact element of the plurality of contact elements includes a first major side, a second major side opposed from the first major side, and at least one side surface extending between the first major side and the second major side. The contact layer further includes a contact surface at least partially defined by the first major sides of the plurality of contact elements and a backing surface at least partially defined by the second major sides of the plurality of contact elements. The conformable apparatus also includes a backing layer positioned against the backing surface of the contact layer.

In one example, a system for treating a composite material includes a conformable apparatus that includes a contact layer that is conformable and includes a plurality of contact elements. Each contact element of the plurality of contact elements includes a first major side, a second major side opposed from the first major side, and at least one side surface extending between the first major side and the second major side. The contact layer further includes a contact surface at least partially defined by the first major sides of the plurality of contact elements and a backing surface at least partially defined by the second major sides of the plurality of contact elements. The conformable apparatus also includes a backing layer positioned against the backing surface of the contact layer. The system further includes a tool having a tooling surface opposed from the contact surface. The composite material is positioned between the tooling surface and the contact surface.

In one example, a method for treating a composite material includes placing the composite material on a tool having a tool surface such that the composite material includes an outer surface opposed from the tooling surface. The method also includes positioning a conformable apparatus relative to the outer surface of the composite material such that a contact layer of the conformable apparatus is in contact with the outer surface of the composite material. The method further includes conforming the contact layer to the outer surface of the composite material.

In one example, a method for sizing a conformable apparatus that includes a heat source and a contact layer having a contact surface includes relating treatment dwell time of the conformable apparatus with heat applied by the conformable apparatus, relating a type of material to be treated with a surface area of the contact surface of the contact layer, and determining an optimal size of the conformable apparatus based on the processing requirements of the material.

Other examples of the disclosed apparatuses, systems and methods will become apparent from the following detailed description, the accompanying drawings and the appended claims.

BRIEF DESCRIPTION OF THE DRAWINGS

FIG. 6A is a side view of the contact layer shown in FIG. 3 conforming to a concave surface;

FIG. 6B is a side view of the contact layer shown in FIG. 3 conforming to a convex surface;

DETAILED DESCRIPTION

Figure 1:
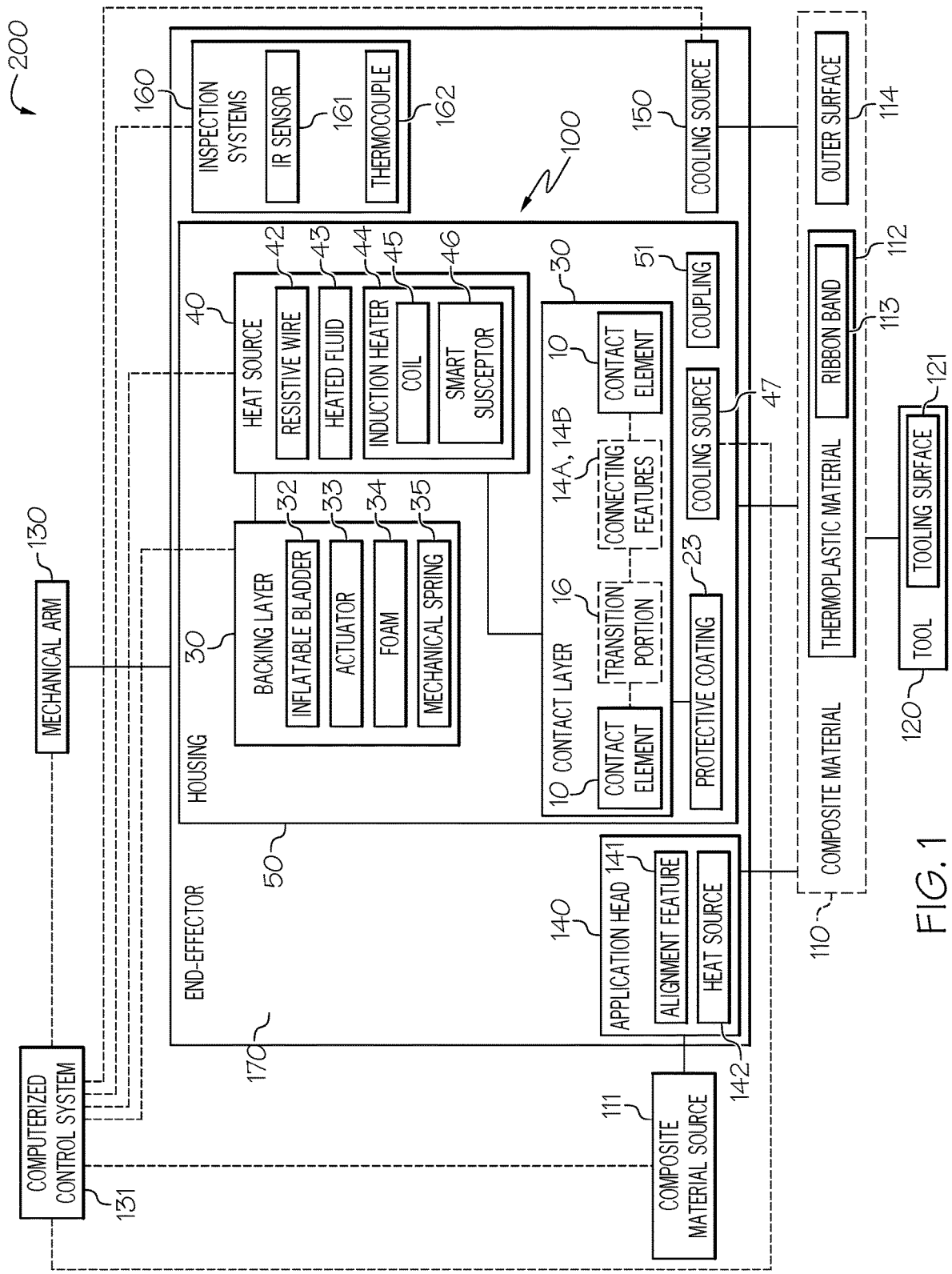
FIG. 1 is a nested block diagram of an example of the disclosed system for treating a composite material.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one embodiment and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Figure 2:
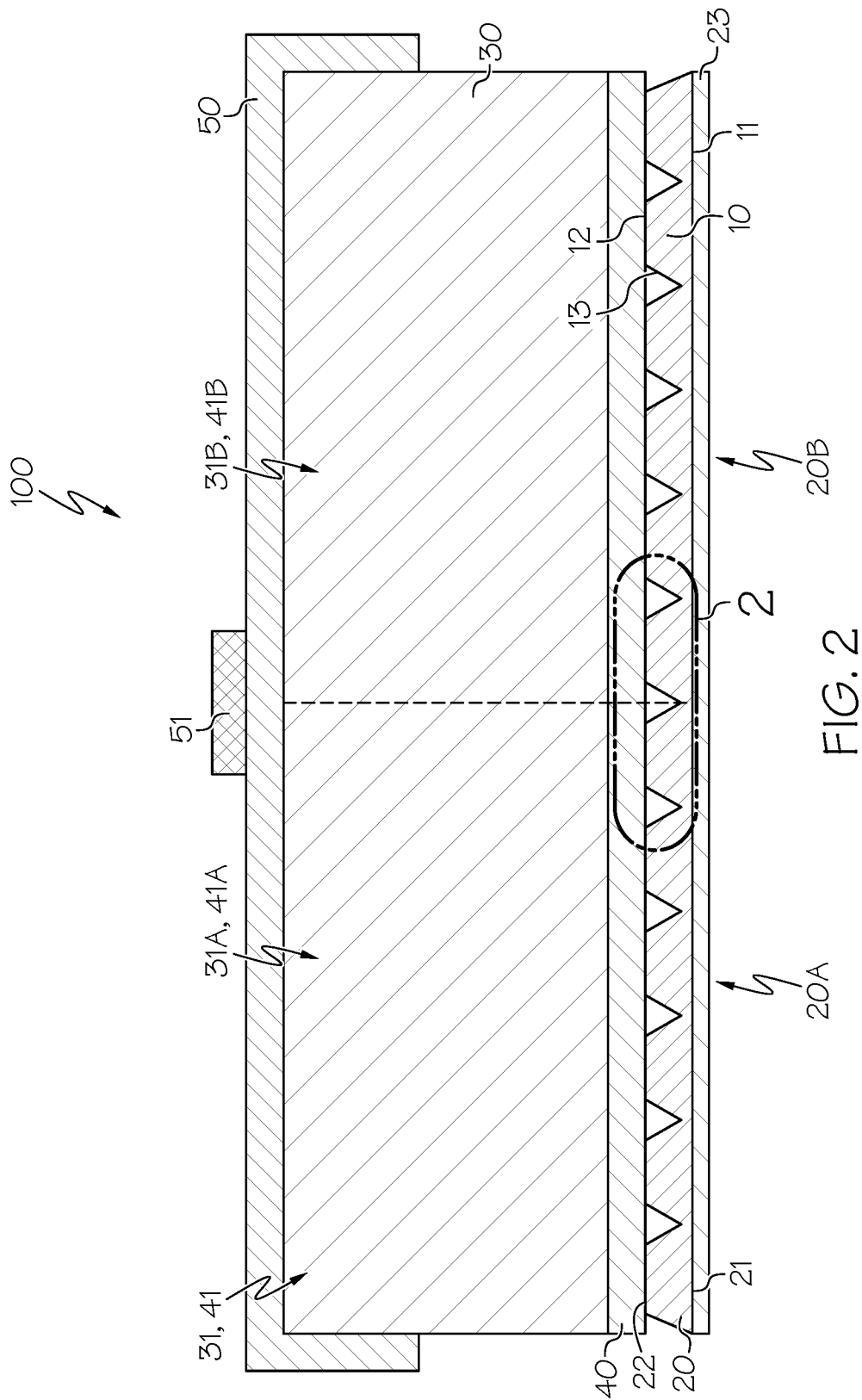
FIG. 2 is a side elevational view, in cross-section, of an example of the disclosed conformable apparatus for treating a composite material.

Referring to FIGS. 1 and 2, disclosed is an example of a conformable apparatus 100 for treating (e.g., smoothing, compressing and/or compacting) a composite material 110 (such as a thermoplastic composite material). The conformable apparatus 100 may be integrated into various composite material forming processes as a way to smooth and/or shape composite materials. The conformable apparatus 100 includes a contact layer 20 and a backing layer 30. The contact layer 20 is conformable and includes a contact surface 21 for contacting the composite material 110, as well as a backing surface 22 opposed from the contact surface 21. The backing layer 30 is positioned against the backing surface 22.

The contact layer 20 of the conformable apparatus 100 includes a plurality of contact elements 10. The contact elements 10 may be made of any one of (or combination of) various suitable materials, such as a metallic material, a ceramic material, and the like. Further, the contact elements 10 may be manufactured by any one of (or combination of) various manufacturing methods, such as additive manufacturing, casting, machining, and the like.

Each contact element 10 of the plurality of contact elements 10 includes a first major side 11, a second major side 12 opposed from the first major side 11, and at least one side surface 13 extending between the first major side 11 and the second major side 12. The contact surface 21 of the contact layer 20 is at least partially defined by the first major sides 11 of the plurality of contact elements 10. Similarly, the backing surface 22 of the contact layer 20 is at least partially defined by the second major sides 12 of the plurality of contact elements 10.

The conformability of the contact layer 20 is dependent on the intermobility of the contact elements 10. As such, the size, shape, and interconnectedness of the contact elements 10 may determine the degree of conformability of the contact layer 20.

Figure 3:
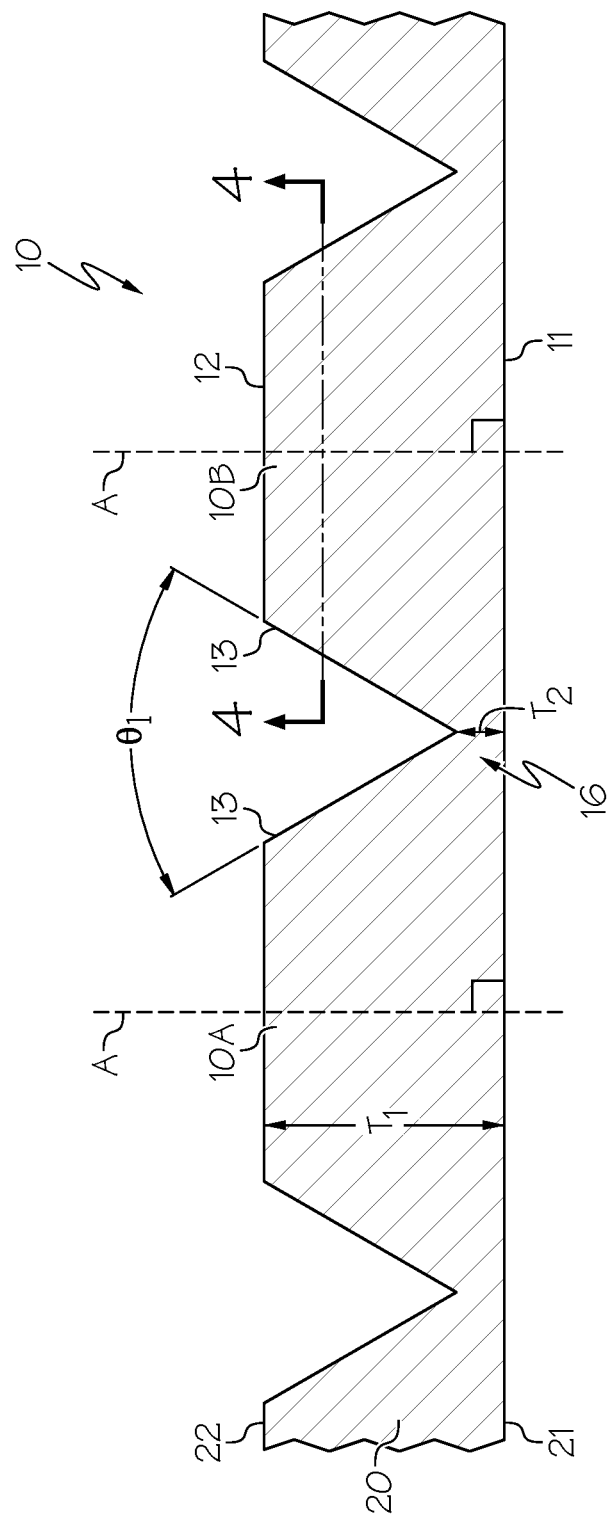
FIG. 3 is a side elevational view, in cross-section, of the contact layer of the conformable apparatus shown in FIG. 2.

Referring to FIG. 3, the first major sides 11 of each contact element 10 of the plurality of contact elements 10 may be substantially planar and may define an axis A that is perpendicular to the substantially planar first major side 11. Further, the contact elements 10 may have a maximum cross-sectional thickness $T_1$ parallel to axis A. In one example, the maximum cross-sectional thickness $T_1$ ranges from about 0.5 cm to about 1.5 cm. In another example, the maximum cross-sectional thickness $T_1$ ranges from about 1.5 cm to about 1.75 cm. In yet another example, the maximum cross-sectional thickness $T_1$ ranges from about 1.75 cm to about 2.0 cm.

Figure 4:
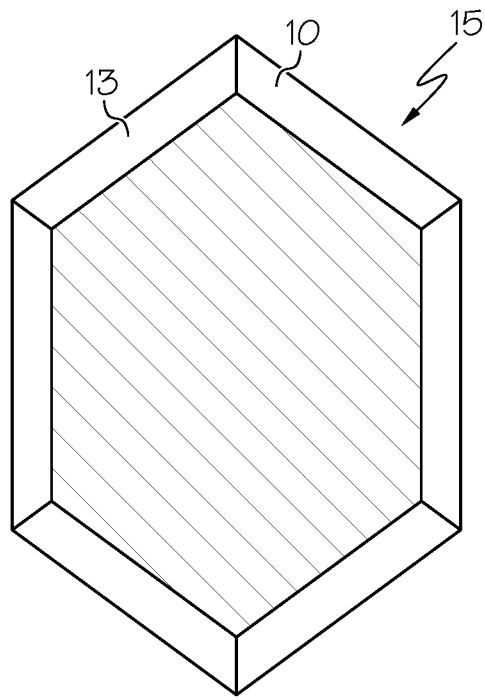
FIG. 4 is a top view, in cross-section, of a contact element of the contact layer shown in FIG. 2.
Figure 5:
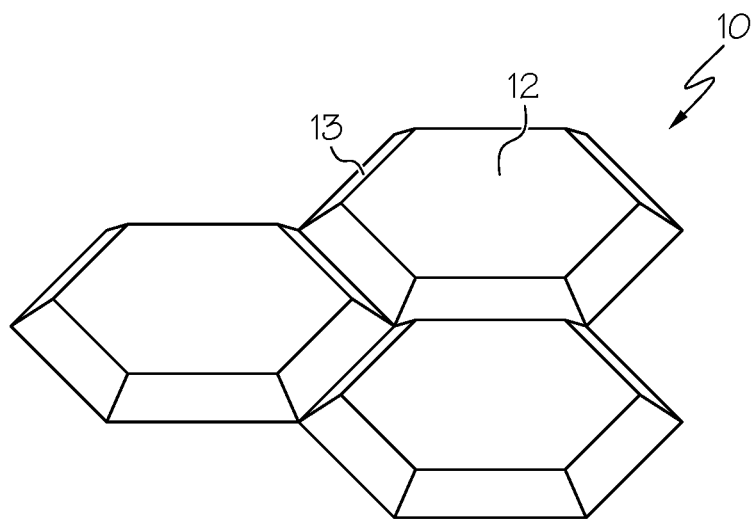
FIG. 5 is a side perspective view of the contact layer shown in FIG. 3.

Referring to FIG. 4, each contact element 10 of the plurality of contact elements 10 may have a cross-sectional shape 15 along a plane that is parallel to the substantially planar first major sides 11 of the plurality of contact elements 10. This cross-sectional shape 15 is defined by the number of side surfaces 13 on the contact element 10 and may take the shape of a circle, an oval, or any number of a variety of polygons. In one example, the cross-sectional shape 15 is a square. In another example, the cross-sectional shape 15 is a hexagon. In yet another example, cross-sectional shape 15 is an octagon. Further, those skilled in the art will appreciate that the cross-sectional shapes 15 of the contact elements 10 need not be uniform. For example, the plurality of contact elements 10 may include contact elements 10 having a square cross-sectional shape 15 in addition to contact elements 10 having an octagonal cross-sectional shape 15. Likewise, referring specifically to contact elements 10 with a polygonal cross-sectional shape 15, the shape of the cross-sections need not be regular (e.g., equiangular and equilateral). Those skilled in the art will appreciate that contact elements 10 with irregular cross-sectional shapes 15 may be employed without departing from the scope of the present disclosure.

The density of contact elements 10 in any given unit area of the contact surface 21 may vary. In one example, the contact layer 20 may include at least 2 contact elements 10 per 20 $cm^2$ of the contact surface 21. In another example, the contact layer 20 may include at least 6 contact elements 10 per 20 $cm^2$ of the contact surface 21. In yet another example, the contact layer 20 may include at least 10 contact elements 10 per 20 $cm^2$ of the contact surface 21. Those skilled in the art will appreciate, however, that the density of contact elements 10 across the contact surface 21 need not be uniform. A contact surface 21 may define a first portion having a first density of contact elements 10 and a second portion having a second density of contact elements 10 that is substantially different from the first density.

Figure 7:
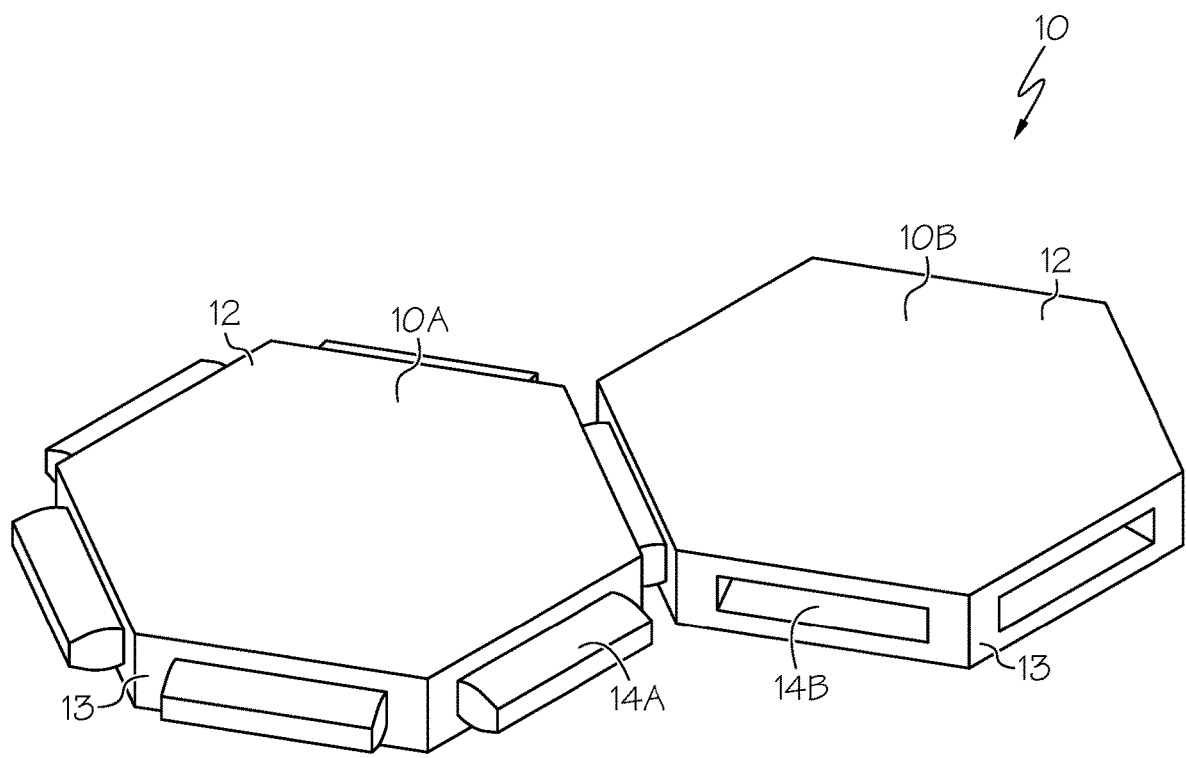
FIG. 7 is a side perspective of two contact elements being connected by a first and second connecting feature.
Figure 8:
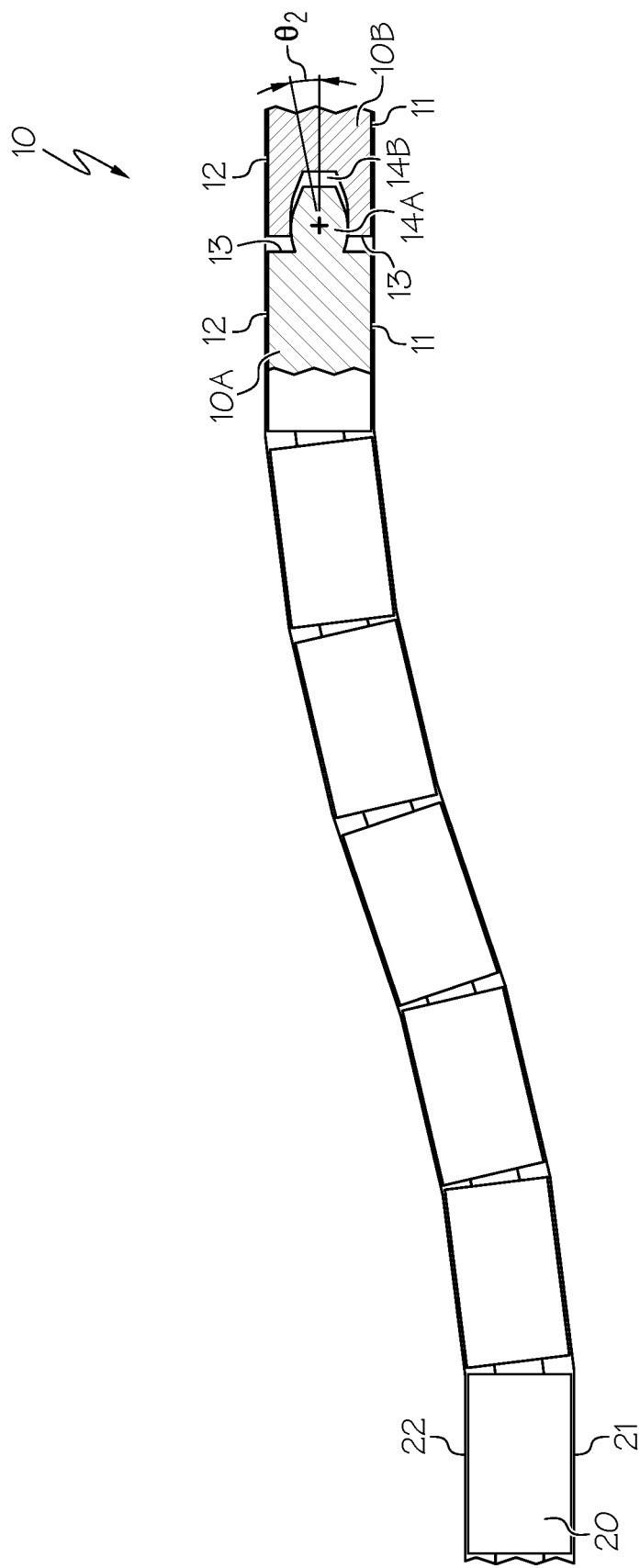
FIG. 8 is a side view of the contact layer shown in FIG. 7 conforming to a contoured surface.

As illustrated in FIGS. 3, 5, 6A, 6B, 7 and 8, each contact element 10 of the plurality of contact elements 10 may be connected to at least one adjacent contact element 10 of the plurality of contact elements 10. Those skilled in the art will appreciate that there are numerous ways to connect adjacent contact elements 10 without departing from the scope of the present disclosure. FIGS. 3, 5, 6A and 6B illustrates one non-limiting example and FIGS. 7 and 8 illustrates another.

Referring to FIGS. 3, 5 6A and 6B, each contact element 10 of the plurality of contact elements 10 may be integral with at least one adjacent contact element 10 of the plurality of contact elements 10. Each contact element 10 of the plurality of contact elements 10 may define a transition portion 16 extending at least partially between its first major side 11 and its second major side 12, where the contact element 10 is integral with an adjacent contact element 10. As shown, this transition portion 16 may extend from the first major sides 11 of the plurality of contact elements 10 toward the second major sides 12 of the plurality of contact elements 10, such that the contact surface 21 of the contact layer 20 is continuous.

Referring to FIGS. 6A and 6B, when the contact surface 21 of the conformable apparatus 100 is positioned against a non-planar object, the contact elements 10 may pivot hingedly about their transition portions 16 and relative to one another, thereby enabling the contact layer 20 to conform to the non-planar object. Therefore, the conformability of the contact layer 20 may depend, at least in part, on the thickness $T_2$ of the transition portion 16. As the thickness $T_2$ of the transition portion 16 increases, the ability of the contact elements 10 to pivot relative to one another may decrease. In one example, the thickness $T_2$ of the transition portion 16 may range from about 2 mm to about 4 mm. In another example, the thickness $T_2$ of the transition portion 16 may range from about 4 mm to about 6 mm.

As shown in FIG. 3, the side surface 13 of a first contact element 10A of the plurality of contact elements 10 may be disposed at a non-zero angle $\Theta_1$ relative to a side surface 13 of a second contact element 10B of the plurality of contact elements 10. This angle $\Theta_1$ may be defined in terms of when the first major sides 11 of the contact elements 10 are coplanar. In one example, the non-zero angle $\Theta_1$ is between 12° and 25° when the first major side 11 of the first contact element 10A is coplanar with the first major side 11 of the second contact element 10B. In another example, the non-zero angle $\Theta_1$ is between 26° and 38° when the first major side 11 of the first contact element 10A is coplanar with the first major side 11 of the second contact element 10B. In yet another example, the non-zero angle $\Theta_1$ is between 39° and 50° when the first major side 11 of the first contact element 10A is coplanar with the first major side 11 of the second contact element 10B.

This angle $\Theta_1$ may increase or decrease as the first and second contact elements 10A, 10B pivot relative to one another (e.g., such that their first major sides 11 are no longer coplanar). Referring specifically to FIG. 6A, this angle $\Theta_1$ may decrease as the first and second contact elements 10A, 10B pivot relative to one another as the contact layer 20 positioned against a concave surface. Referring specifically to FIG. 6B, this angle $\Theta_1$ may increase as the first and second contact elements 10A, 10B pivot relative to one another as the contact layer is positioned against a convex surface.

Referring to FIGS. 7 and 8, an example of non-integrally connected contact elements 10 is disclosed. In this example, the side surface 13 of a first contact element 10A of the plurality of contact elements 10 may include a first connecting feature 14A, the side surface 13 of a second contact element 10B of the plurality of contact elements 10 may include a second connecting feature 14B, and the first connecting feature 14A may be engaged with the second connecting feature 14B to pivotably couple the first contact element 10A with the second contact element 10B. The first and second connecting features 14A, 14B may be any one of (or combination of) various suitable joining mechanisms, such as a tongue-and-groove-type joint, a ball joint, a hinge joint and the like. As shown, the first major sides 11 of the contact elements 10 in this example may define a discontinuous contact surface 21. Further, when the contact layer 20 is conformed, the contact elements 10 of the contact layer 20 may pivot relative to one another hingedly about the first and second connecting features 14A, 14B. As such, the degree of conformability of the contact layer 20 is dependent, at least in part, on the available degree $\Theta_2$ of angular displacement within the first and second connecting features 14A, 14B.

Those skilled in the art will appreciate, however, that the contact elements 10 may not be interconnected at all. In these examples, the contact elements 10 may either be connected directly to the backing layer 30 or to some other structure (excluding adjacent contact elements) which may otherwise facilitate their intermobility. As such, the contact layer 20 may still conform to a non-planar object even if the contact elements 10 don't hingedly pivot relative to one another.

The conformable apparatus 100 may also include a protective coating 23 that covers at least a portion of the contact surface 21. This protective coating 23 may be a low friction coating that is applied to prevent wear and facilitate the movement of the conformable apparatus 100 across a surface. When applied to a discontinuous contact surface 21, the protective coating 23 may also prevent the buildup of contamination (such as thermoplastic resin) onto the contact surface 21 and between the contact elements 10. The protective coating 23 may be made of any one of (or combination of) various suitable materials, such as a fluoropolymer material, a synergistic coating material, and the like.

Figure 9:
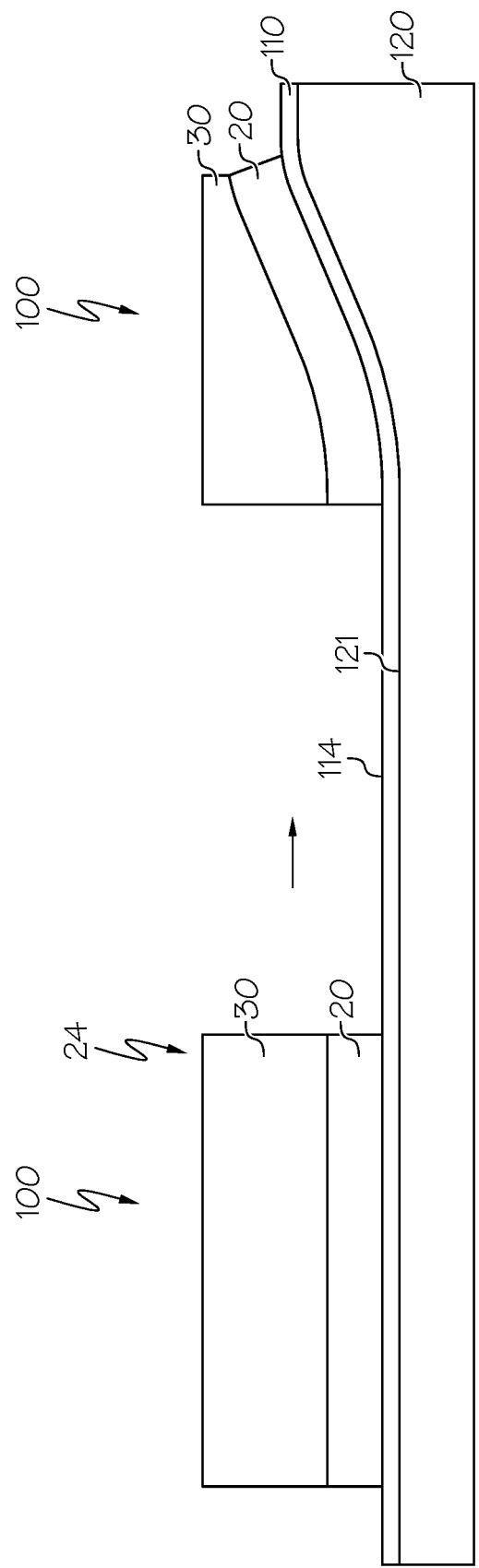
FIG. 9 is a side view of an example of the disclosed system for treating a composite material, showing a conformable apparatus conforming to a contoured surface.

Referring to FIG. 9, the contact layer may have a non-conformed, default configuration 24. This default configuration 24 may include a substantially planar alignment of the contact elements 10. The backing layer 30 may bias the contact layer 20 into this default configuration 24 when the contact layer 20 is not conforming to a non-planar object, and resist inward mechanical deformation (e.g., towards the backing layer) when it is. As such, the backing layer 30 may improve the degree to which the contact layer 20 conforms to the non-planar object and, in the context of composite material forming, the backing layer 30 may improve the ability of the contact layer 20 to smooth the composite material 110. Those skilled in the art will appreciate that the internal pressure within the backing layer 30 is greater when it is resisting inward mechanical deformation by the contact layer 20 than when it is merely biasing the contact layer 20 into its default configuration 24.

Further, depending on its composition, the backing layer 30 may also maintain an internal pressure against the contact layer 20 greater than that which is required to resist inward mechanical deformation. This greater internal pressure may be transferred through the contact layer 20 and onto the non-planar object. In the context of composite material forming, this may enable the contact layer 20 to shape the composite material 110, not just smooth it.

Referring back to FIG. 1, the backing layer 30 may include at least one of any one of (or combination of) various suitable materials and/or devices, such as an inflatable bladder 32, an actuator 33, foam 34 and a mechanical spring 35. In one example, the backing layer 30 includes an inflatable bladder 32. In one example, the backing layer 30 includes multiple inflatable bladders 32. In one example, the backing layer 30 includes a plurality of actuators 33 coupled to a computerized control system 131. In one example, the backing layer 30 includes foam 34 and a plurality of mechanical springs 35. Those skilled in the art will appreciate that although materials such as foam 34 or mechanical springs 35 may be adequate for resisting inward mechanical deformation by the contact layer 20, inflatable bladders 32 or actuators 33 may be preferred for their ability to maintain a greater internal pressure.

The force applied by the conformable apparatus 100 to the composite material 110 may vary across the contact surface 21 of the contact layer 20. As shown in FIG. 1, the conformable apparatus 100 may include a plurality of treatment zones 31 wherein each treatment zone 31 of the plurality of treatment zones 31 is at least partially defined by a portion of the contact layer 20. Each treatment zones 31 of the plurality of treatment zones 31 may also, however, be at least partially defined by a portion of the backing layer 30. Further, each of these treatment zones 31 may be capable of applying a different compressive force to a composite material 110. In one example, a conformable apparatus 100 may include a first treatment zone 31A and a second treatment zone 31B. The first treatment zone 31A may exert a first compressive force and the second treatment zone 31B may exert a second compressive force that is substantially different (e.g., substantially greater than or less than) from the first compressive force. Those skilled in the art will appreciate that a conformable apparatus 100 may include more than two treatment zones 31 without departing from the scope of the present disclosure.

As shown in FIGS. 1 and 2, the conformable apparatus 100 may include a heat source 40 positioned to heat at least a portion of the contact layer 20. In the context of composite material forming, the heat source 40 may heat the composite material 110 in order to lower the viscosity of the resin matrix, thereby making the composite material 110 easier to smooth and/or shape. In one example, the heat source 40 may be positioned between the contact layer 20 and the backing layer 30. In another example, the heat source 40 may be positioned within the backing layer 30. In yet another example, the heat source 40 may be positioned between the contact elements 10 of the plurality of contact elements 10.

The heat source 40 may include a variety of suitable heat mechanisms, such as resistive wire 42, heated fluid 43, and induction heater 44, and the like. In an example, the heat source 40 may include a resistive wire 42 positioned between the contact layer 20 and the backing layer 30. In an example, the heat source 40 may include heated fluid 43 positioned within the backing layer 30. In an example, the heat source 40 may include heated fluid 43 positioned between the contact elements 10. In an example, the heat source 40 may include heated fluid 43 positioned within an inflatable bladder 32. In an example, the heat source 40 may include an induction heater 44 that heats a coil 45 positioned between the contact layer 20 and the backing layer 30. In an example, the heat source 40 may include an induction heater 44 that heats a smart susceptor 46 positioned between the contact layer 20 and the backing layer 30. In an example, the heat source 40 may include an induction heater 44 positioned between the contact layer 20 and the backing layer 30 that heats the composite material 110 directly. Those skilled in the art will appreciate that these examples are non-limiting and that other heat mechanisms, combinations of heat mechanisms, and positionings within the conformable apparatus may be employed without departing from the scope of the present disclosure.

The heat applied by the conformable apparatus 100 to the composite material 110 may vary across the contact surface 21 of the contact layer 20. In some examples, the conformable apparatus 100 may include a plurality of heat zones 41 wherein each heat zone 41 of the plurality of heat zones 41 is at least partially defined by a portion of the contact layer 20. As shown, however, each heat zone 41 of the plurality of heat zones 41 may also be at least partially defined by a portion of the backing layer 30. Further, each of these heat zones 41 may be capable of maintaining different portions of the contact layer 20 at different temperatures. In one example, the plurality of heat zones 41 includes a first heat zone 41A and a second heat zone 41B. The first heat zone 41A maintains a first portion of the contact layer 20A at a first temperature and the second heat zone 41B maintains a second portion of the contact layer 20B at a second temperature that is substantially different from the first temperature. Those skilled in the art will appreciate that a conformable apparatus 100 may include more than two heat zones 41 without departing from the scope of the present disclosure.

The ability of the conformable apparatus 100 to apply non-uniform heating and non-uniform compression to a composite material 110 (such as a thermoplastic composite material) may be desirable in a variety of applications. A composite material 110 may be placed against a complex contoured surface wherein the distribution of composite material 110 across the complex contoured surface is uneven due to the presence of crevices or protrusions in the complex contoured surface. A composite material 110 may be deliberately placed unevenly against a planar surface in accordance with design specifications. A monolithic composite structure having distinct finished properties across various regions of the composite structure may be desired. Whatever the reason, those skilled in the art will appreciate that the heat and/or compression required to process a composite material 110 may not be consistent across the composite material 110, and that the ability of the conformable apparatus 100 to apply non-uniform heating and non-uniform compression enables the conformable apparatus 100 to respond to such varying processing requirements.

The conformable apparatus 100 may also include a cooling source 47 within the conformable apparatus 100 which is positioned to cool at least a portion of the contact layer 20. The cooling source 47 may cool the composite material 110 in order to solidify it and thereby form a finished shape. In one example, the cooling source 47 may be positioned between the contact layer 20 and the backing layer 30. In an example, the cooling source 47 may be positioned within the backing layer 30. In an example, the cooling source 47 may be positioned between the contact elements 10 of the plurality of contact elements 10.

The cooling source 47 may include a variety of suitable cooling mechanisms, such as ventilated air, heat pumps connected to heat sinks, and the like. In an example, the cooling source 47 may include a heat pump positioned between the contact layer 20 and the backing layer 30. In an example, the cooling source 47 may include ventilated air positioned within the backing layer 30. In an example, the cooling source may include ventilated air positioned between the contact elements 10. In an example, the cooling source may include ventilated air positioned within an inflatable bladder 32.

Those skilled in the art will appreciate that heat sources 40 and cooling sources 47 may be simultaneously utilized to improve the functionality of a conformable apparatus 100. Heat sources 40 and cooling sources 47 may operate in conjunction to enable a greater temperature range for the aforementioned heat zones 41. As such, a conformable apparatus 100 may heat a composite material 110, smooth and/or shape it, and then solidify its shape.

The conformable apparatus 100 may additionally include a housing 50 to protect the internal components of the conformable apparatus 100. In one example, the housing 50 may at least partially receive the backing layer 30. In another example, the housing 50 may entirely receive the backing layer 30 and partially receive the contact layer 20. Further, the housing 50 may also include or be connected to a coupling 51 that may couple the conformable apparatus 100 to various components and/or devices of a larger system, such as a mechanical arm.

Still referring to FIG. 1, an example system 200 for treating a composite material 110 (such as a thermoplastic composite material) is disclosed. In this example system 200, the conformable apparatus 100 may be utilized to apply a compressive force to a composite material 110. The system 200 includes a conformable apparatus 100 that includes a contact layer 20 and a backing layer 30. The contact layer 20 is conformable and includes a plurality of contact elements 10 that include a first major side 11, a second major side 12 opposed from the first major side 11, and at least one side surface 13 extending between the first major side 11 and the second major side 12. The contact layer 20 further includes a contact surface 21 that is at least partially defined by the first major sides 11 of the plurality of contact elements 10 and a backing surface 22 that is at least partially defined by the second major sides 12 of the plurality of contact elements 10. The backing layer 30 is a positioned against the backing surface 22 of the contact layer 20. The system 200 further includes a tool 120 (e.g., a mandrel) having a tooling surface 121 (e.g., a layup surface) opposed from the contact surface 21 of the conformable apparatus 100 and a composite material 110 positioned between the tooling surface 121 of the tool 120 and the contact surface 21 of the conformable apparatus 100.

The backing layer 30 may apply a compressive force to the backing surface 22 of the contact layer 20, which may then be transferred through the contact layer 20 to compress the composite material 110. Those skilled in the art will appreciate that the degree to which the composite material 110 is compressed depends, at least in part, on the composition of the backing layer 30. Where the backing layer 30 includes materials such as foam 34 or mechanical springs 35, the backing layer 30 may resist mechanical deformation by the contact layer 20 by maintaining an internal pressure within the conformable apparatus 100. Foam 34 or mechanical springs 35 may be selected for applications where the contact layer deforms due to being positioned against a non-planar surface, such as a composite material having a contoured outer surface. As such, the contact layer 20 may conform to the composite material 110 and, in doing so, simultaneously compress the composite material 110 against the tooling surface 121 of the tool 120. Further, where the backing layer 30 includes devices such as an inflatable bladder 32 or an actuator 33, a greater internal pressure within the conformable apparatus 100 may be achieved, thereby enabling the contact layer 20 to apply a greater compressive force to the composite material 110.

In some examples, the conformable apparatus 100 used in the system 200 may also include a heat source 40 within the conformable apparatus 100. This heat source 40 may heat the composite material 110 either prior to, simultaneously with, or after the conformable apparatus 100 treats the composite material 110. The heat source 40 may heat the composite material 110 to lower its viscosity (increase flexibility and tackiness/adherence to prior plies), which thereby improves formability.

The conformable apparatus 100 may connected to movement device. In an example, the conformable apparatus 100 may be the end-effector 170 of a mechanical arm 130. The mechanical arm 130 may be connected to the conformable apparatus 100 and configured to move the conformable apparatus 100 relative to the composite material 110. The mechanical arm 130 may also be in communication with a computerized control system 131 that may control the movement of the mechanical arm 130 (e.g., robotized). As such, the mechanical arm 130 may be any one of a variety of suitable machines, such as a serial manipulator, a cartesian coordinate robot, and the like. Those skilled in the art will appreciate, however, that movement devices that do not include a mechanical arm 130 may also be employed without departing from the scope of the present disclosure.

The system 200 may include an application head 140 positioned proximate the conformable apparatus 100 that is configured to place composite material 110 on the tooling surface 121 of the tool 120. The application head 140 may house a variety of internal components to facilitate the placing of the composite material 110, such as an alignment feature 141 and a heat source 142. The alignment feature 141 may pre-align the composite material 110 prior to placement, which may be desired for composite materials that contain reinforcing fibers, and the heat source 142 may be configured to heat the composite material 110 to lower its viscosity (increase flexibility and tackiness/adherence to prior plies). The application head 140 may also be connected to a composite material source 111 that supplies composite material 110 to the application head 140. The composite material source 111 may be a bulk roll of thermoplastic material or some other composite material supply system. Those skilled in the art will appreciate that in example systems wherein the conformable apparatus 100 is moved relative to the composite material 110, it may be preferable to position the application head 140 upstream from the conformable apparatus 100 (e.g., leading the conformable apparatus 100) so that it may place the composite material 110 prior to being treated by the conformable apparatus 100. It may also be preferable to position the application head 140 in close proximity to the conformable apparatus 100. In doing so, the conformable apparatus 100 may treat the composite material 110 (that was heated and placed by the application head) before composite material 110 significantly cools.

The system 200 may also include a cooling source 150 positioned proximate the conformable apparatus 100 that is configured to cool the composite material 110. The cooling of the composite material 110 may solidify its shape. Those skilled in the art will appreciate that in example systems wherein the conformable apparatus 100 is moved relative to the composite material 110, it may be preferred to position the cooling source 150 downstream from the conformable apparatus 100 (e.g., trailing the conformable apparatus 100) so that it may cool the composite material 110 after it has been treated by the conformable apparatus 100.

The system may also include an inspection system 160 for monitoring the operation of the conformable apparatus 100. The inspection system 160 may include any number of sensors (such as an infrared sensor 161 or a thermocouple 162) located throughout and/or surrounding the conformable apparatus 100 to detect changes in internal processing conditions (such as temperature and pressure within the conformable apparatus 100) as well as external processing conditions (such as the position of the conformable apparatus 100 relative to the system 200 and the placement of the composite material 110).

Optionally, the application head 140, the composite material source 111, the cooling source 150, and/or the inspection system 160 may be additional end-effector 170 components that are connected to a mechanical arm 130 alongside the conformable apparatus 100. These components 140, 111, 150, 160 may be in communication with a computerized control system 131 that may control their various functions. Further, the internal components of the conformable apparatus, such as the heat source 40, the cooling source 47, and the backing layer 30 may also be in communication with the computerized control system 131.

At this point, it should be understood that the inspection system 160 and the computerized control system 131 may work in conjunction with the various components of the disclosed system 200 (both within and external to the conformable apparatus 100) to provide real time feedback and control of the system 200 throughout the composite material forming process. The inspection system 160 may collect data concerning various processing conditions within the system 200, which then may be transmitted to the computerized control system 131 where an operator may input commands to the various components in response to the collected data.

A variety of composite materials may be used in the system 200. In terms of composition, the composite material 110 may include a polymeric resin composed of either a thermoplastic material 112 and/or a thermoset material. The composite material 110 may also include reinforcing fibers (such as carbon fibers) embedded in the polymeric resin (e.g., prepreg). Further, the composite material 110 may also vary in structure. In one example, the composite material 110 may be a layup of prepreg. In another example, the composite material 110 may be a ribbon band 113 of prepreg. Those skilled in the art will appreciate that other composite material compositions and structures may be utilized without departing from the scope of the present disclosure.

Some composite materials, such as thermosets, require being consistently maintained at high temperatures throughout the forming process. Without being bound by any particular theory, it is believed that the ability of the conformable apparatus 100 and the application head 140 to continuously apply heat while simultaneously treating the composite material 110 makes the disclosed conformable apparatus 100 and system 200 particularly well suited for high temperature composite material forming processes.

Figure 10:
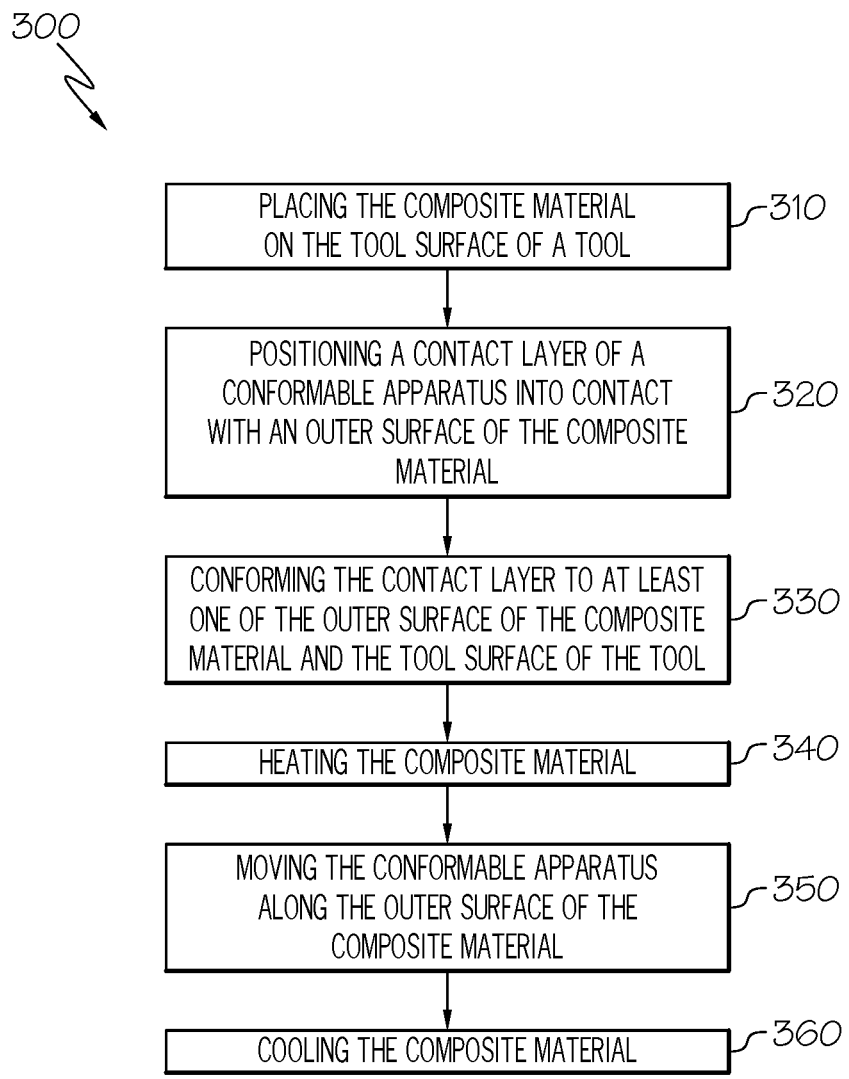
FIG. 10 is a flow diagram depicting an example of the disclosed method for treating a composite material.

As illustrated in FIG. 10, an example method 300 for treating a composite material (such as a thermoplastic composite material) is disclosed. The method includes placing a composite material 110 on a tool 120 having a tool surface 121 such that the composite material 110 includes an outer surface 114 opposed from the tooling surface 121 (block 310). In one or more examples, block 310 may include using an application head 140 to perform the placing 310 of the composite material 110 onto the tooling surface 121 of the tool 120. Depending of the functionality of the application head 140, the application head 140 may also pre-align and/or heat the composite material 110 prior to the placing 310.

The method 300 also includes positioning a conformable apparatus 100 relative to the outer surface 114 of the composite material 110 such that a contact layer 20 of the conformable apparatus 100 is in contact with the outer surface 114 of the composite material 110 (block 320). The method 300 further includes conforming the contact layer 20 to at least one of the outer surface 114 of the composite material 110 and the tool surface 121 of the tool 120 (block 330).

In examples where a contact layer 20 of the conformable apparatus 100 conforms to the outer surface 114 of the composite material 110, the post-treatment finished composite structure may retain the shape it was placed in prior to treatment by the conformable apparatus 100. In examples where a contact layer 20 of the conformable apparatus 100 conforms to the tool surface 121 of a tool 120, the post-treatment finished structure may correspond to the shape of the tool surface 121, which may be contoured. Those skilled in the art will appreciate that a conformable apparatus 100 containing a backing layer 30 that include devices such as inflatable bladders 32 or actuators 33 may be preferred for applications where the contact layer 20 conforms to the tool surface 121 of a tool 120 due to their ability to achieve a greater internal pressure.

In one or more examples, block 320 may be performed by using a conformable apparatus 100 that includes a plurality of contact elements 10. In this example, the conforming of the contact layer 20 in block 330 may involve pivoting a contact element 10 of the plurality of contact elements 10 relative to an adjacent contact element 10 of the plurality of contact elements 10. Where the contact elements 10 of the plurality of contact elements 10 are connected by an integral transition portion 16 or a first and second connection feature 14A, 14B, the contact elements 10 may pivot hingedly about the integral transition portion 16 or the first and second connection features 14A, 14B.

In one or more examples, block 320 may be performed by using a conformable apparatus 100 that includes a backing layer 30 positioned against the contact layer 20. In these examples, the method 300 for treating a composite material 110 may include biasing the contact layer 20 outward relative to the backing layer 30, such as toward a default configuration 24 of the contact layer 20. These examples may also include mechanically deforming the backing layer 30 with the contact layer 20, such as when the contact layer 20 is conforming to a non-planar object.

In an example, the positioning of the conformable apparatus 100 in block 320 may involve applying a compressive force to the composite material 110 with the contact layer 20. This compressive force may or may not be uniform across the contact layer 20. In another example, the method 300 may be performed using a conformable apparatus 100 that includes a plurality of treatment zones 31, where each treatment zone 31 of the plurality of treatment zones 31 is at least partially defined by a portion of the contact layer 20. In this example, the method 300 may further include applying a first compressive force within a first treatment zone 31A of the plurality of treatment zones 31 to a portion of the composite material 110 and applying a second compressive force within a second treatment zone 31B of the plurality of treatment zones 31 to a different portion of the composite material 110. The first compressive force may be substantially different from the second compressive force.

Those skilled in the art will appreciate that blocks 310, 320 and 330 are not limited to any particular order. In one example, the conforming 330 of the contact layer 20 may occur simultaneously with the positioning 320 of the conformable apparatus 100 relative to the outer surface 114 of the composite material 110. Further, it is contemplated that blocks 320 and 330 may occur prior to block 310 (e.g., the conformable apparatus 100 may be positioned relative to the composite material 110 before the composite material 110 is placed onto the tooling surface 121 of the tool 120).

In an example, the method 300 may additionally include heating 340 the composite material 110 while the composite material 110 is positioned between the contact layer 20 and the tooling surface 121. As such, block 340 may occur after the composite material 110 has been placed 310 on the tooling surface 121 of the tool 120 and after the conformable apparatus 100 has be positioned 320 against the composite material 110. Further, the heat used to heat the composite material 110 may be generated by a variety of sources. In an example, the heating 340 of the composite material 110 may be performed by the tool 120. In another example, the heating 340 of the composite material 110 may be performed by the conformable apparatus 100. In yet another example, the heating 340 of the composite material 110 may be performed by some other heat source not contained within or connected to either the tool 120 or the conformable apparatus 100.

Where the composite material 110 is being heated by the conformable apparatus 100, the heat applied by the conformable apparatus 100 to the composite material 110 may or may not be uniform. In an example, the method 300 may be performed using a conformable apparatus 100 that includes a plurality of heat zones 41 (see FIG. 2). This example may include heating a first heat zone 41A of the plurality of heat zones 41 to a first temperature and heating a second heat zone 41B of the plurality of heat zones 41 to a second temperature. The first temperature may be substantially different than the second temperature.

In an example, the method 300 may also include moving 350 the conformable apparatus 100 along the outer surface 114 of the composite material 110. The movement 350 of the conformable apparatus 100 may be performed by a mechanical arm 130. In this way, the conformable apparatus 100 may smooth and/or shape the composite material 110 as it moved along its outer surface 114.

In an example, the method 300 may further include cooling 360 the composite material 110. Those skilled in the art will appreciate that block 360 may be performed at any time throughout the method 300 and is not limited by any particular order. In one example, the composite material 110 may be cooled by the conformable apparatus 100 after the composite material 110 has been placed (block 310). Further, the composite material 110 may be cooled by a variety of different sources to consolidate the composite material 110. In an example, the cooling 360 of the composite material 110 may be performed by the tool 120. In another example, the cooling 360 of the composite material 110 may be performed by the conformable apparatus 100. In yet another example, the cooling 360 of the composite material 110 may be performed by a cooling source 150 positioned proximate the conformable apparatus 100.

In an example, the method 300 may include treating a composite material 110 within a system 200 that includes a computerized control system 131 in communication with an inspection system 160 and a backing layer 30 that includes a plurality of actuators 33. In this example, the inspection system 160 may detect changes within the system 200, transmit data to the computerized control system 131, and the actuators 33 may be adjusted in real time (e.g., real time feedback control).

In an example, the method 300 may include treating a composite material 110 within a system 200 that includes a computerized control system 131 in communication with an inspection system 160 and a backing layer 30 that includes a heat source 40. In this example, the inspection system 160 may detect changes within the system 200, transmit data to the computerized control system 131, and the temperature of the conformable apparatus 100 may be adjusted in real time (e.g., real time feedback control).

Those skilled in the art will appreciate that the inspection system 160 and the computerized control system 131 may be coupled with any of the various components within the system 200 to control those components in real time.

Figure 11:
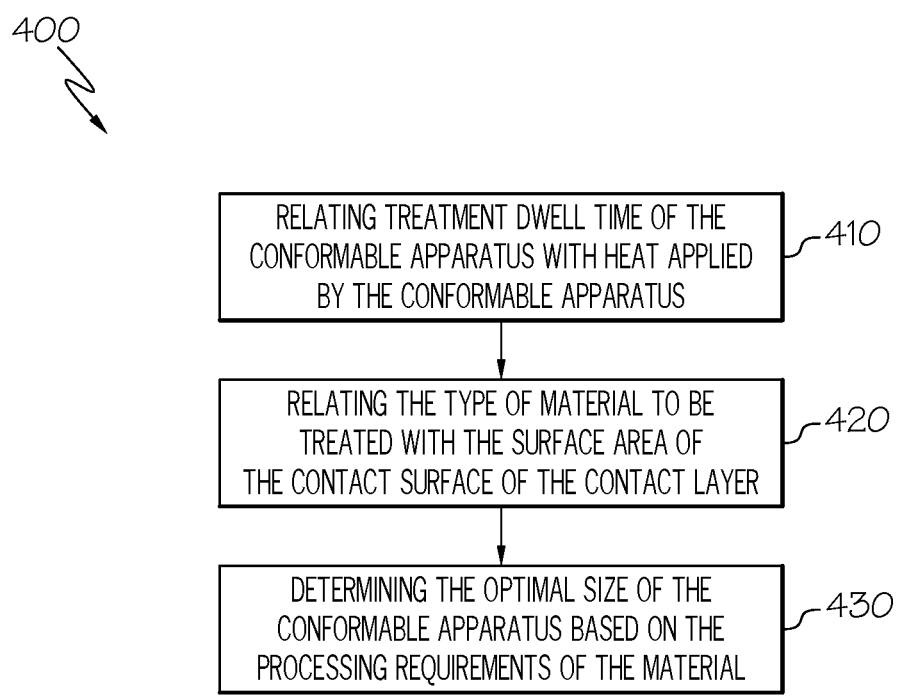
FIG. 11 is a flow diagram depicting an example of the disclosed method for sizing a conformable apparatus that includes a heat source and a contact layer that includes a contact surface.

As illustrated in FIG. 11, an example method 400 for sizing a conformable apparatus 100 that includes a heat source 40 and a contact layer 20 that includes a contact surface 21 is disclosed. The method 400 includes relating treatment dwell time of the conformable apparatus 100 with heat applied by the conformable apparatus 100. The method 400 also includes relating a type of material (such as a thermoplastic composite material) to be treated with a surface area of the contact surface 21 of the contact layer 20. The method 400 further includes determining the optimal size of the conformable apparatus 100 based on the processing requirements of the material.

Those skilled in the art will appreciate that the method 400 disclosed in FIG. 11 may also include relating a variety of additional processing factors, such as the velocity at which the conformable apparatus 100 may be moved relative to the composite material 110, the degree of compressive force the conformable apparatus 100 is capable of applying, the degree to which the contact layer 20 of the conformable apparatus conforms to the outer surface 114 of the composite material 110 and the desired properties of the finished material.

Figure 12:
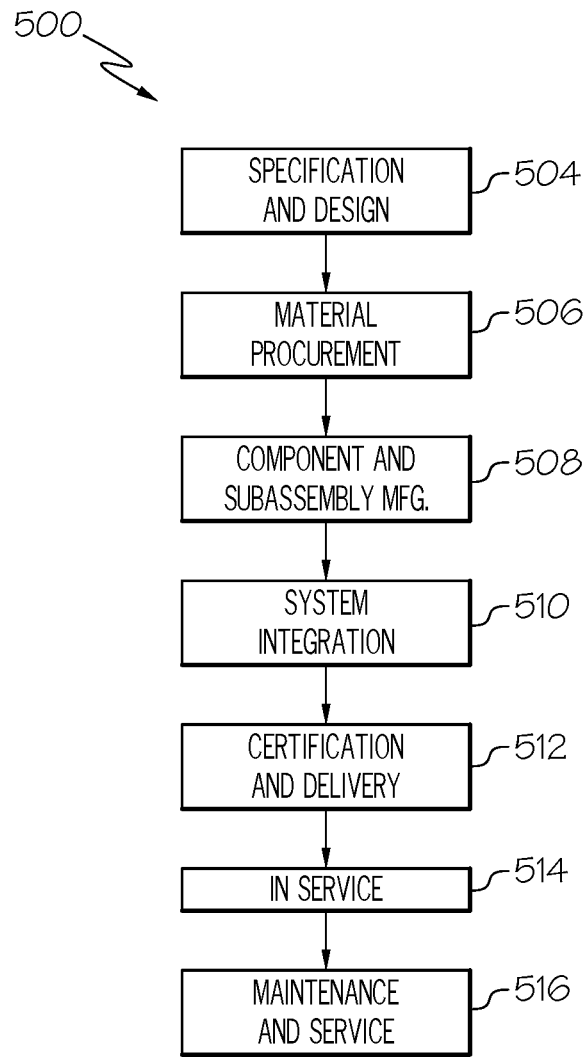
FIG. 12 is a flow diagram of an aircraft manufacturing and service methodology.
Figure 13:
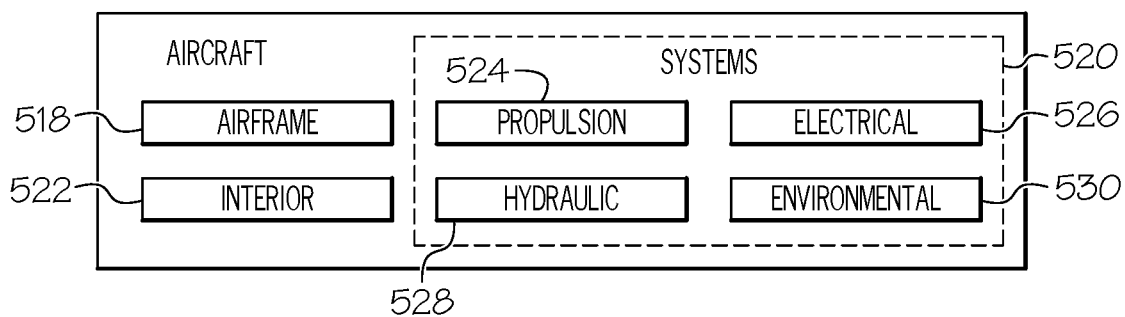
FIG. 13 is a block diagram of an aircraft

Examples of the disclosure may be described in the context of an aircraft manufacturing and service method 500, as shown in FIG. 12, and an aircraft 502, as shown in FIG. 13. During pre-production, the aircraft manufacturing and service method 500 may include specification and design 504 of the aircraft 502 and material procurement 506. During production, component/subassembly manufacturing 508 and system integration 510 of the aircraft 502 takes place. Thereafter, the aircraft 502 may go through certification and delivery 512 in order to be placed in service 514. While in service by a customer, the aircraft 502 is scheduled for routine maintenance and service 516, which may also include modification, reconfiguration, refurbishment and the like.

Each of the processes of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 13, the aircraft 502 produced by example method 500 may include an airframe 518 with a plurality of systems 520 and an interior 522. Examples of the plurality of systems 520 may include one or more of a propulsion system 524, an electrical system 526, a hydraulic system 528, and an environmental system 530. Any number of other systems may be included.

The disclosed conformable apparatus, system and method for treating a composite material may be employed during any one or more of the stages of the aircraft manufacturing and service method 500. As one example, the disclosed conformable apparatus, system and method for treating a composite material may be employed during material procurement 506. As another example, components or subassemblies corresponding to component/subassembly manufacturing 508, system integration 510, and or maintenance and service 516 may be fabricated or manufactured using the disclosed conformable apparatus, system and method for treating a composite material. As another example, the airframe 518 and the interior 522 may be constructed using the disclosed conformable apparatus, system and method for treating a composite material. Also, one or more apparatus examples, method examples, or a combination thereof may be utilized during component/subassembly manufacturing 508 and/or system integration 510, for example, by substantially expediting assembly of or reducing the cost of an aircraft 502, such as the airframe 518 and/or the interior 522. Similarly, one or more of system examples, method examples, or a combination thereof may be utilized while the aircraft 502 is in service, for example and without limitation, to maintenance and service 516.

The disclosed conformable apparatus, system and method for treating a composite material are described in the context of an aircraft; however, one of ordinary skill in the art will readily recognize that the disclosed conformable apparatus, system and method for treating a composite material may be utilized for a variety of applications. For example, the disclosed conformable apparatus, system and method for treating a composite material may be implemented in various types of vehicles including, e.g., helicopters, passenger ships, automobiles and the like.

Although various examples of the disclosed conformable apparatus, system and method for treating a composite material have been shown and described, modifications may occur to those skilled in the art upon reading the specification. The present application includes such modifications and is limited only by the scope of the claims.

What is claimed is:

1. A conformable apparatus for treating a composite material, said conformable apparatus comprising:
   a housing;
   a mechanical arm connected to said housing;
   a backing layer that is at least partially received by said housing; and
   a contact layer comprising a plurality of contact elements that form a contact surface and a backing surface that is opposite said contact surface and that is positioned against said backing layer,
   wherein:
      each contact element of said plurality of contact elements is movable between a planar orientation and a nonplanar orientation relative to another contact element of said plurality of contact elements such that said contact layer is conformable to a contour of said composite material;
      said mechanical arm is configured to move said housing along a contoured surface of said composite material and to apply a uniform compressive force to said housing;
      said housing applies said uniform compressive force to said backing layer;
      said backing layer is configured to apply non-uniform compressive forces to said contact layer in response to said uniform compressive force applied to said backing layer; and
      said contact layer conforms to said contoured surface of said composite material and applies said non-uniform compressive forces to said composite material to accommodate said contour of said composite material as said mechanical arm moves said housing along said contoured surface of said composite material.

2. The conformable apparatus of claim 1, wherein each contact element of said plurality of contact elements comprises a first major side, a second major side opposed from said first major side, and at least one side surface extending between said first major side and said second major side.

3. The conformable apparatus of claim 2, wherein:
   said side surface is oriented at an oblique angle relative to said first major side and said second major side;
   each contact element of said plurality of contact elements is flexibly connected by an integral transition portion with at least one adjacent contact element of said plurality of contact elements; and
   said integral transition portion is located between said side surface and said first major side.

4. The conformable apparatus of claim 1, wherein said contact surface is continuous.

5. The conformable apparatus of claim 1, further comprising a protective coating covering at least a portion of said contact surface.

6. The conformable apparatus of claim 1, wherein said backing layer comprises at least one inflatable bladder.

7. The conformable apparatus of claim 1, further comprising a plurality of treatment zones, wherein each treatment zone of said plurality of treatment zones is at least partially defined by a portion of said contact layer and by a portion of said backing layer.

8. The conformable apparatus of claim 7, wherein:
   the plurality of treatment zones comprises:
      a first treatment zone of said plurality of treatment zones configured to exert a first compressive force; and
      a second treatment zone of said plurality of treatment zones configured to exert a second compressive force; and
   said first compressive force is different from said second compressive force.

9. The conformable apparatus of claim 1, further comprising a heat source positioned to heat at least a portion of said contact layer.

10. The conformable apparatus of claim 9, wherein:
    said conformable apparatus further comprises a plurality of heat zones;
    each heat zone of the plurality of heat zones is at least partially defined by a portion of the contact layer and by a portion of the backing layer;
    a first heat zone of said plurality of heat zones is configured to maintain a first portion of said contact layer at a first temperature supplied by the heat source;
    a second heat zone of said plurality of heat zones is configured to maintain a second portion of said contact layer at a second temperature supplied by the heat source; and
    said first temperature is different from said second temperature.

11. The conformable apparatus of claim 1, further comprising a cooling source positioned to cool at least a portion of said contact layer.

12. The conformable apparatus of claim 2, wherein:
    said at least one side surface of a first contact element of said plurality of contact elements comprises a first connecting feature;
    said at least one side surface of a second contact element of said plurality of contact elements comprises a second connecting feature; and
    said first connecting feature is engaged with said second connecting feature to pivotably couple said first contact element with said second contact element.

13. The conformable apparatus of claim 12, wherein said first connecting feature and said second connecting feature comprises a tongue-and-groove-type joint.

14. The conformable apparatus of claim 1, wherein said contact surface is discontinuous.

15. The conformable apparatus of claim 2, wherein each contact element of said plurality of contact elements has a polygonal cross-sectional shape along a plane that is parallel to said first major side.

16. The conformable apparatus of claim 1, wherein each contact element of said plurality of contact elements is flexibly connected to a directly adjacent contact element of the said plurality of contact elements.

17. The conformable apparatus of claim 1, wherein said backing layer comprises a plurality of actuators.

18. The conformable apparatus of claim 1, wherein said backing layer comprises a resilient foam.

19. The conformable apparatus of claim 1, wherein said backing layer comprises at least one mechanical spring.

20. The conformable apparatus of claim 1, wherein said plurality of contact elements of said contact layer is connected to said backing layer.

21. A system for treating a composite material, said system comprising:
    a tool having a tooling surface configured to receive the composite material;

a conformable apparatus comprising:
  a housing;
  a mechanical arm connected to said housing;
  a backing layer that is at least partially received by said housing; and
  a contact layer comprising a plurality of contact elements that form a contact surface and a backing surface that is opposite said contact surface and that is positioned against said backing layer;
wherein:
  each contact element of said plurality of contact elements is flexibly connected and movable between a planar orientation and a nonplanar orientation relative to another contact element of said plurality of contact elements such that said contact layer is conformable to a contour of said composite material;
  said mechanical arm is configured to move said housing along a contoured surface of said composite material and to apply a uniform compressive force to said housing;
  said housing applies said uniform compressive force to said backing layer;
  said backing layer is configured to apply non-uniform compressive forces to said contact layer in response to said uniform compressive force applied to said backing layer; and
  said contact layer conforms to said contoured surface of said composite material and applies said non-uniform compressive forces to said composite material to accommodate said contour of said composite material as said mechanical arm moves said housing along said contoured surface of said composite material.

22. The system of claim 21, further comprising a computerized control system in communication with said mechanical arm, wherein said computerized control system controls movement of said mechanical arm.

23. The system of claim 21, further comprising an application head positioned proximate said conformable apparatus, wherein said application head is configured to place said composite material on the tooling surface of the tool.

24. The system of claim 21, further comprising at least one of:
  a heat source positioned to heat at least a portion of at least one of said contact layer and said composite material; and
  a cooling source positioned to cool at least a portion of at least one of said contact layer and said composite material.

25. The system of claim 21, wherein said composite material comprises a thermoplastic composite material.

26. The system of claim 21, wherein said plurality of contact elements of said contact layer is connected to said backing layer.

27. A method for treating a composite material, said method comprising:
  placing said composite material on a tool having a tooling surface, said composite material comprising an outer surface opposed from said tooling surface, and said outer surface of said composite material having a contour;
  providing a conformable apparatus comprising:
    a housing;
    a mechanical arm connected to said housing;
    a backing layer that is at least partially received by said housing; and
    a contact layer comprising a plurality of contact elements that form a contact surface and a backing surface that is opposite said contact surface and that is positioned against said backing layer;
  positioning said conformable apparatus relative to said outer surface of said composite material such that said contact surface of said contact layer of said conformable apparatus is in contact with said outer surface of said composite material;
  applying a uniform compressive force to said housing of said conformable apparatus via said mechanical arm;
  applying said uniform compressive force to said backing layer of said conformable apparatus;
  moving said conformable apparatus along said outer surface of said composite material via said mechanical arm;
  applying non-uniform compressive forces to said contact layer using said backing layer in response to said uniform compressive force while moving said conformable apparatus along said outer surface of said composite material;
  applying said non-uniform compressive forces, from said backing layer, to said composite material using said contact layer while moving said conformable apparatus along said outer surface of said composite material; and
  moving said plurality of contact elements between a planar orientation and a non-planar orientation relative to each other to conform said contact layer to said contour of said outer surface of said composite material while moving said conformable apparatus along said outer surface of said composite material.

28. The method of claim 27, wherein said moving said plurality of contact elements between said planar orientation and said non-planar orientation comprises pivoting at least one contact element of said plurality of contact elements relative to at least one adjacent contact element of said plurality of contact elements.

29. The method of claim 27 wherein:
  said conformable apparatus comprises a plurality of treatment zones;
  each treatment zone of said plurality of treatment zones is at least partially defined by a portion of said contact layer and by a portion of said backing layer; and
  said applying said non-uniform compressive forces, from said backing layer, to said composite material using said contact layer comprises:
    applying a first compressive force within a first treatment zone of said plurality of treatment zones to a portion of said composite material; and
    applying a second compressive force within a second treatment zone of said plurality of treatment zones to a different portion of said composite material; and
  said first compressive force is different from said second compressive force.

30. The method of claim 27, further comprising heating at least a portion of said composite material while moving said conformable apparatus along said outer surface of said composite material,
wherein:
  said conformable apparatus comprises a plurality of heat zones;
  each heat zone of the plurality of heat zones is at least partially defined by a portion of said contact layer and by a portion of said backing layer;
  said heating at least a portion of said composite material comprises:

heating a first heat zone of said plurality of heat zones to a first temperature; and heating a second heat zone of said plurality of heat zones to a second temperature; and said first temperature is different from said second temperature.

\* \* \* \* \*